United States Patent
Han et al.

(10) Patent No.: US 12,205,357 B2
(45) Date of Patent: Jan. 21, 2025

(54) LEARNING ORDINAL REPRESENTATIONS FOR DEEP REINFORCEMENT LEARNING BASED OBJECT LOCALIZATION

(71) Applicant: NEC Laboratories America, Inc., Princeton, NJ (US)

(72) Inventors: Shaobo Han, Princeton, NJ (US); Renqiang Min, Princeton, NJ (US); Tingfeng Li, Plainsboro, NJ (US)

(73) Assignee: NEC Corporation, Tokyo (JP)

( * ) Notice: Subject to any disclaimer, the term of this patent is extended or adjusted under 35 U.S.C. 154(b) by 499 days.

(21) Appl. No.: 17/715,901

(22) Filed: Apr. 7, 2022

(65) Prior Publication Data

US 2022/0327814 A1 Oct. 13, 2022

Related U.S. Application Data

(60) Provisional application No. 63/193,916, filed on Jul. 28, 2021, provisional application No. 63/191,403, filed on May 21, 2021, provisional application No. 63/172,171, filed on Apr. 8, 2021.

(51) Int. Cl.
*G06V 10/778* (2022.01)
*G06V 10/82* (2022.01)
*G06V 30/19* (2022.01)

(52) U.S. Cl.
CPC .......... *G06V 10/7788* (2022.01); *G06V 10/82* (2022.01); *G06V 30/19167* (2022.01)

(58) Field of Classification Search
CPC ............... G06V 10/7788; G06V 10/82; G06V 30/19167
See application file for complete search history.

(56) References Cited

U.S. PATENT DOCUMENTS

| 11,995,522 B2* | 5/2024 | Lourentzou | G06F 18/217 |
| 2011/0134128 A1* | 6/2011 | Hu | G06T 11/206 345/440 |
| 2019/0147621 A1* | 5/2019 | Alesiani | G06T 7/73 382/190 |
| 2020/0410228 A1* | 12/2020 | Wang | G06N 3/04 |
| 2022/0292107 A1* | 9/2022 | Novotny | G06N 20/00 |

* cited by examiner

Primary Examiner — John B Strege
(74) Attorney, Agent, or Firm — Joseph Kolodka

(57) ABSTRACT

A reinforcement learning based approach to the problem of query object localization, where an agent is trained to localize objects of interest specified by a small exemplary set. We learn a transferable reward signal formulated using the exemplary set by ordinal metric learning. It enables test-time policy adaptation to new environments where the reward signals are not readily available, and thus outperforms fine-tuning approaches that are limited to annotated images. In addition, the transferable reward allows repurposing of the trained agent for new tasks, such as annotation refinement, or selective localization from multiple common objects across a set of images. Experiments on corrupted MNIST dataset and CU-Birds dataset demonstrate the effectiveness of our approach.

2 Claims, 22 Drawing Sheets

| Method | Last conv | Number of fc layer | Last fc | Pool size | Train loc Acc (%) | | | Test loc Acc (%) | |
|---|---|---|---|---|---|---|---|---|---|
| | | | | | Joint train | Fix embed | Joint train | Fix embed |
| 1fc | 64 | 1 | 1024 | 7 | 76.52 | 85.04 | 81.67 | 85.95 |
| 2fc_512 | 64 | 2 | 512 | 7 | 92.64 | 90.91 | 95.21 | 92.67 |
| 2fc_conv128 | 128 | 2 | 512 | 5 | 92.25 | 90.45 | 95.42 | 92.57 |
| 2fc_conv128_p7 | 128 | 2 | 512 | 7 | 92.11 | 90.14 | 94.50 | 90.96 |

FIG. 9

| | 0 | 1 | 2 | 3 | 4 | 5 | 6 | 7 | 8 | 9 |
|---|---|---|---|---|---|---|---|---|---|---|
| Ord Acc (%) | 94.91 | 92.86 | 90.93 | 92.54 | 93.17 | 92.15 | 94.99 | 92.61 | 92.92 | 93.16 |
| Loc Acc (%) | 95.52 | 97.14 | 70.93 | 94.96 | 94.26 | 92.38 | 95.09 | 89.11 | 96.20 | 94.65 |

FIG. 10

| Method | Random | Anchor |
|---|---|---|
| $OrdAcc$ (%) | 90.12 | 92.97 |

FIG. 13(A)

| Sign | Digit 4 | Other digits |
|---|---|---|
|  | 90.92 | 82.43 |
| ✓ | 94.36 | 88.64 |

FIG. 13(B)

| Method | Digit 4 | Other digits |
|---|---|---|
| DQN | 88.80±1.6 | 84.21±2.0 |
| DQN+History | 86.54±4.3 | 81.75±3.4 |
| PG | 88.98±2.9 | 81.91±2.7 |
| PG+RNN | 94.68±0.9 | 89.05±1.7 |

*FIG. 15(A)*

| Mode | $OrdAcc(\%)$ | $CorLoc(\%)$ |
|---|---|---|
| Self | 97.24 | 61.03 |
| Proto | 95.17 | 68.28 |
| Shuffle self | 92.41 | 67.59 |
| Shuffle proto | 92.76 | 80.35 |

*FIG. 15(B)*

| | 4 | 0 | 1 | 2 | 3 | 5 | 6 | 7 | 8 | 9 | mean |
|---|---|---|---|---|---|---|---|---|---|---|---|
| Ord Inst Acc (%) | 92.97±2.0 | 91.94±0.7 | 90.31±2.9 | 92.05±1.8 | 91.98±0.2 | 92.71±0.6 | 92.59±0.2 | 90.66±0.7 | 91.99±0.7 | 90.49±0.7 | 91.64±0.5 |
| Ord Proto Acc (%) | 92.67±1.7 | 90.31±0.3 | 89.07±0.4 | 90.99±1.1 | 90.30±0.4 | 91.59±0.6 | 91.44±0.6 | 90.88±1.5 | 91.17±1.1 | 89.99±0.8 | |
| Ord Other Inst Acc (%) | 92.36±0.3 | 89.39±0.9 | 90.02±1.5 | | | | | | | | |

FIG. 16

| Dataset | Adaptation | $CorLoc(\%)$ |
|---|---|---|
| mnist |  | 87.52 |
|  | ✓ | 100. |
| CUB |  | 68.03 |
|  | ✓ | 73.13 |

FIG. 18(A)

| Adaption | Clutter | Impulse noise | Gaussian noise |
|---|---|---|---|
|  | 39.05 | 22.77 | 68.99 |
| ✓ | 97.67 | 100 | 100 |

FIG. 18(B)

Algorithm 1: Training reward and localization agent input : Input images I, exemplary set $\mathcal{E}$, batch size N
output : agent $q$
pretrain RoI encoder $f$ and projection head $h$
*training*
for *sampled minibatch* $\{x_k\}_{k=1}^{N}$ do
    Compute ground-truth reward embedding $\{g_k\} \in \mathbb{R}^{M \times N}$
    Shuffle and group $\{g_k\} \in \mathbb{R}^{M \times N}$ to $\{g'_k\} \in \mathbb{R}^{M \times N'}$
    Apply $f$ and $q$ to get policies $\{\pi_k^t\} \in \mathbb{R}^{T \times N}$
    Compute rewards $\{r_k^t\} \in \mathbb{R}^{T \times N}$ using (4), where $a = g'_k$
    Get accumulated rewards $\{R_K^t\} \in \mathbb{R}^{T \times N}$
    Normalize $\{R_K^t\}$ to $\{\tilde{R}_k^t\}$
    Call the gradient ascent$\sum \{\tilde{R}_k^t log \pi_k^t\}$
end
*adaptation*
Compute prototype embedding $\bar{g} = \frac{1}{\mathcal{E}} \sum g_k$ of examplary set
for *sampled minibatch* $\{x_k\}_{k=1}^{N}$ do
    repeat step 6 to step 10, except $a = \bar{g}$
end

*FIG. 19*

LEARNING ORDINAL REPRESENTATIONS FOR DEEP REINFORCEMENT LEARNING BASED OBJECT LOCALIZATION

CROSS REFERENCE TO RELATED APPLICATIONS

This application claims the benefit of U.S. Provisional Patent Application Ser. No. 63/172,171 filed 8 Apr. 2021 and U.S. Provisional Patent Application Ser. No. 63/193,916 filed 28 Jul. 2021 the entire contents of each is incorporated by reference as if set forth at length herein.

TECHNICAL FIELD

This disclosure relates generally to image processing and recognition. More particularly, it describes systems and methods for learning ordinal representations for deep reinforcement learning based object localization.

BACKGROUND

As those skilled in the art will readily appreciate, in many fields of endeavor, it is often of interest to automatically discover one or more types of common objects within an image or a set of images. Notably, fully supervised object detection or localization methods require large amount of human annotation (i.e., bounding boxes around target objects) in training, which is expensive and impractical in cost-sensitive applications. For example, in distributed fiber optic sensing or digital pathology, high-quality annotations from experienced human experts are very limited while weakly supervised object detection or localization (WSOD or WSOL) approaches requires only image-level annotations (classes). However, such learned annotation(s) is/are often partial, which refers to a most discriminative region of the target object instead of the integral regions. Finally, existing approaches for co-localization are unsupervised, which may provide the unwanted common objects as output if the image dataset contains more than one types of common objects.

SUMMARY

An advance in the art is made according to aspects of the present disclosure directed to systems and methods to address the issues noted above. Advantageously our inventive approach requires only a "seed dataset" with accurate bounding box annotations.

In sharp contrast to traditional fully-supervised object detection/localization approaches, our algorithm requires a much smaller size for the seed dataset. Starting from the seed dataset, a large amount of perturbed boxes are sampled as the reinforcement learning agent exploring the image environment. The preference on these perturbed boxes are naturally determined based on the intersection over Union (IoU) to the ground truth bounding box of the image. We encode this information into an ordinal representation jointly trained with a reinforcement learning annotation agent. Existing deep reinforcement learning based object localization methods fail to encode this information and are therefore with much worse sample efficiency.

In further contrast to WSOD/WSOL methods, our approach focuses explicitly on the similarity between common objects across different images within the same image class, instead of the discrimination across different classes. Image-level class labels can be incorporated but are not mandated.

More specifically, any ambiguity on the class of target object in co-localization is avoided by designating the target object explicitly in the seed dataset. The algorithm works in a human-in-the-loop manner. In particular, when given an image dataset, a human starts annotating a few, and the reinforcement learning agent automatically labels the rest of them following human's guidance.

Our inventive framework is motivated from common challenges of image data annotation in fiber sensing tasks, which is very time-consuming and laborious. However, our method can be applied to other data modalities/applications as well, such as images in digital pathology, object tracking in video, and temporal localization for sound event detection, etc.

Operationally, we view each image as an environment that an annotation agent can interact with by moving the bounding box. The learned localizing strategy shall be generalizable to the new environments (images). To facilitate information sharing from multiple learning stages and across different images, the reward is not given directly via IoU, but indirectly via distances on the learned latent representation.

With our inventive approach, ordinal representation learning and deep reinforcement learning (RL) are jointly trained with mutual benefits. The representation learning model is trained on not only precisely annotated data, but also augmented data with perturbations. Existing representation learning methods do not directly yield more compact cluster on the correctly annotated data. Therefore, the reward can only be defined on the original data, not on its latent embedding. In our approach, a latent embedding function is trained to preserve the ordinal relationship between a pair of imperfect annotations on the same image. In other words, the embedding of a bounding box with higher IoU will be closer to the embedding of ground truth bounding box than that of a box with lower IoU. As a result, the RL reward can be defined based on embedding distance.

If the ordinal embedding is trained separately with the deep RL agent, then the perturbed samples are generated randomly, the majority of samples would not be on the search path of RL agent, and therefore redundant and inefficient. In the proposed joint training scheme, the box pairs are sampled when the RL agent is exploring the embedding space, so the ordinal embedding can be trained more efficiently. At different stage of learning, the supervision is customized. The model will learn to assign preference to a pair of better-annotated boxes at later stage of training.

As a byproduct, the embedding distance also provides a metric for assessing the quality of annotation. Given a set of images with both high and low quality annotations, the well-annotated data falls into compact clusters in our ordinal embedding space. Therefore, they can be selected. The quality of annotations can be ranked according to the distance to the cluster centroids of filtered data.

Finally, our recurrent neural network (RNN) based methods allow explorations starting from the whole image. This makes our approach applicable to large-scale single image co-localization problems that contains multiple common objects of the same class, even if the targeted objects are of different size, and the images are high-resolution. The interactive process between human and RL annotator works as follows. A human initiates the annotation process by labeling one or two target objects of interest. The annotation agent starts from looking at the whole image at a coarse resolution, and follows a top-down scheme to localize the objects in the rest of images by taking a sequence of recursive actions. The human can accept or reject the selected objects, and/or run the annotator again, until no new objects are found.

BRIEF DESCRIPTION OF THE DRAWING

A more complete understanding of the present disclosure may be realized by reference to the accompanying drawing in which:

FIG. 9 is a dataset comparing fixed embedding vs training embedding during RL updates according to aspects of the present disclosure;

FIG. 10 is a dataset showing agent trained and tested on digits 4, as well as other new digits 0-9 according to aspects of the present disclosure;

FIG. 13(A), and FIG. 13(B) are datasets that illustrate: FIG. 13(A) random sampling and anchor sampling on OrdAcc (%); and FIG. 13(B) a comparison with and without sign for IoU reward on CorLoc (%) according to aspects of the present disclosure;

FIG. 15(A), and FIG. 15(B) are datasets that illustrate: FIG. 15(A) CorLoc (%); and FIG. 15(B) a comparison of four training strategies according to the anchor used according to aspects of the present disclosure;

FIG. 16 is a dataset that illustrates performance on different digits according to the anchor used according to aspects of the present disclosure;

FIG. 18(A), and FIG. 18(B) are datasets that illustrate: FIG. 18(A) performance of loose to tight annotated bounding box; and FIG. 18(B) performance when transferring to other background according to aspects of the present disclosure; and FIG. 19 is a listing of an Algorithm I for training and reward localization agent according to the anchor used according to aspects of the present disclosure.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Figure 1:
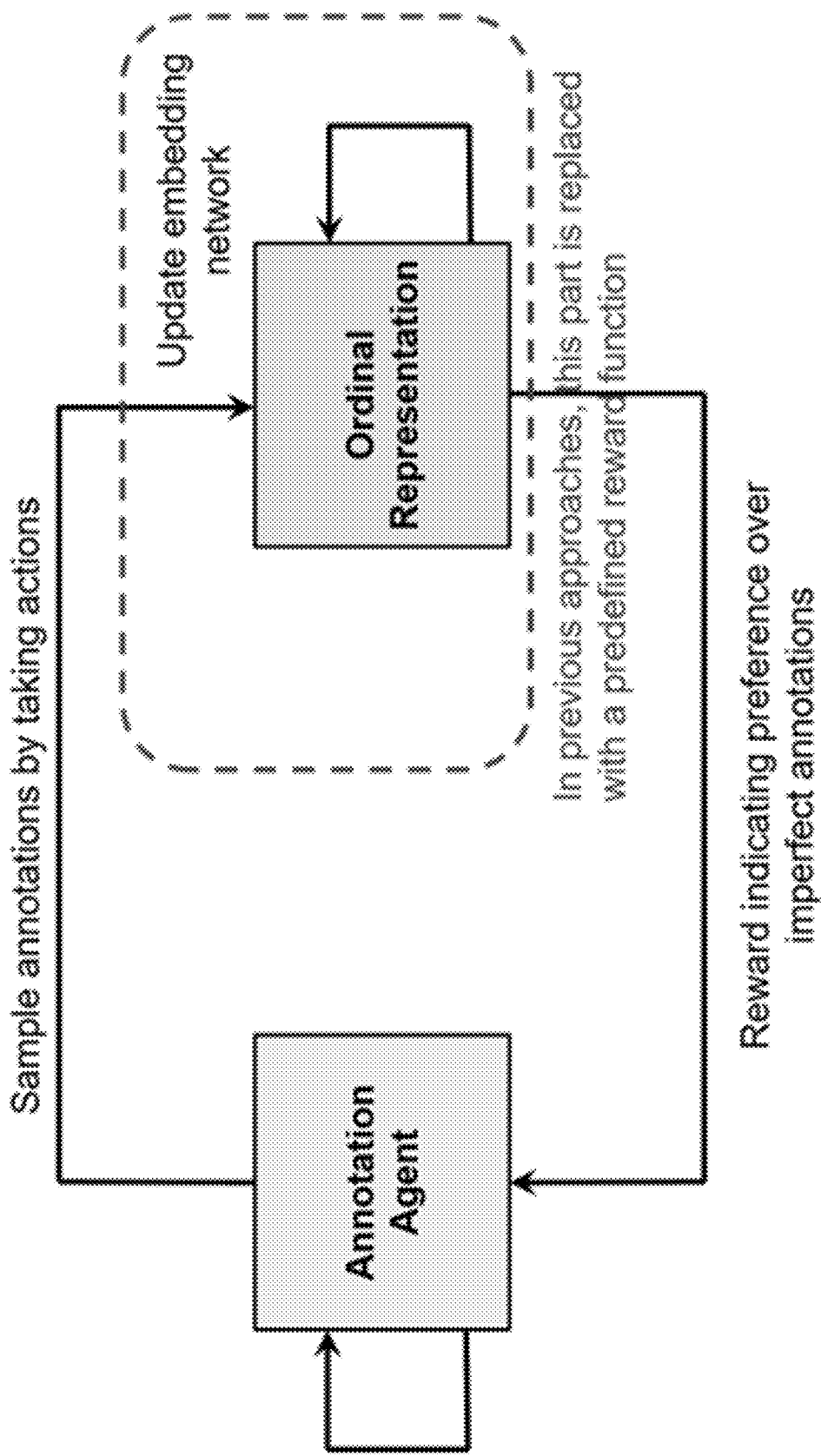
FIG. 1 is a schematic diagram illustrating joint training framework of annotation agent and data representation according to aspects of the present disclosure.

FIG. 1 is a schematic diagram illustrating joint training framework of annotation agent and data representation according to aspects of the present disclosure.

Figure 2:
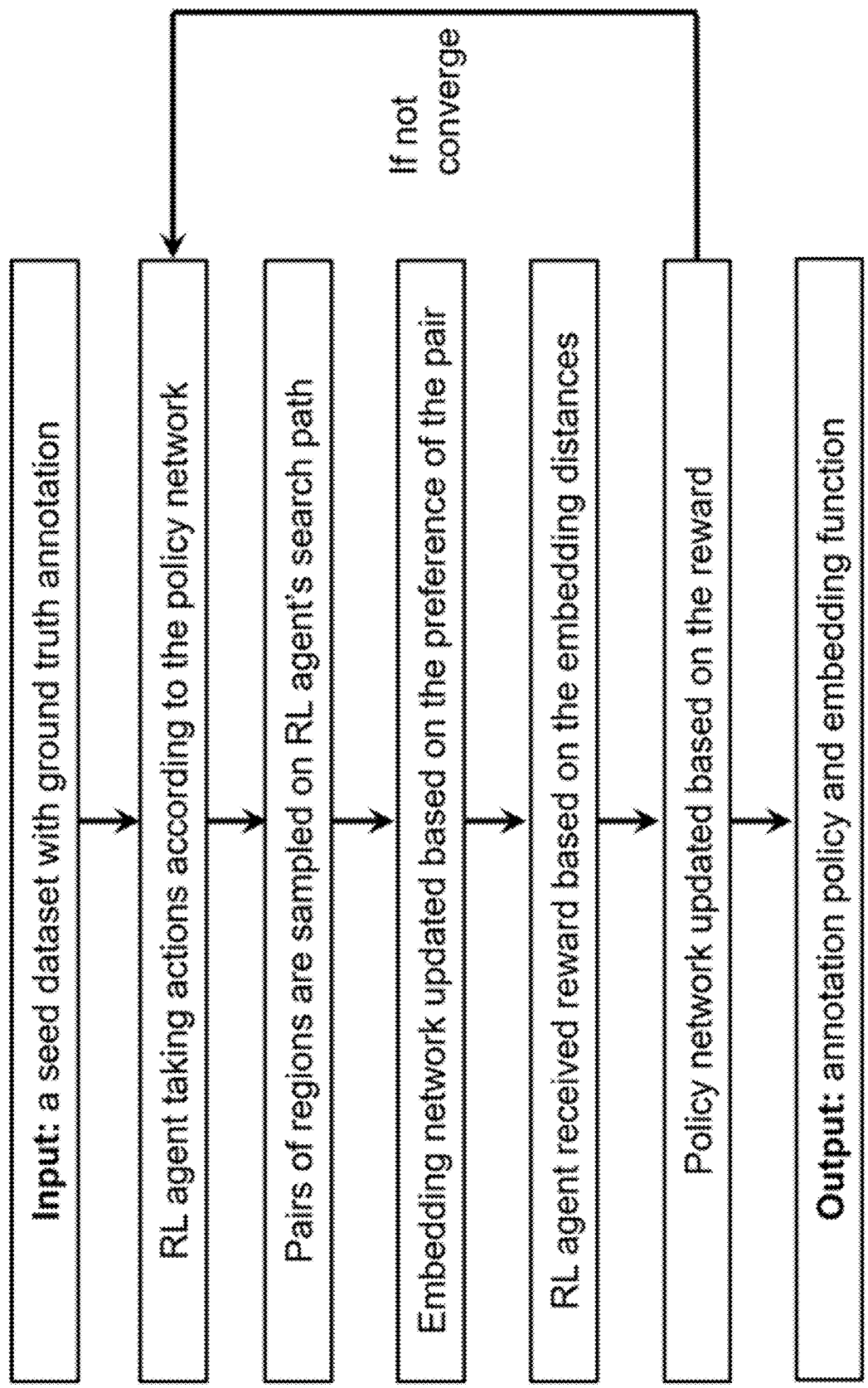
FIG. 2 is a schematic flow diagram illustrating a model training process according to aspects of the present disclosure.

FIG. 2 is a schematic flow diagram illustrating a model training process according to aspects of the present disclosure.

Figure 3:
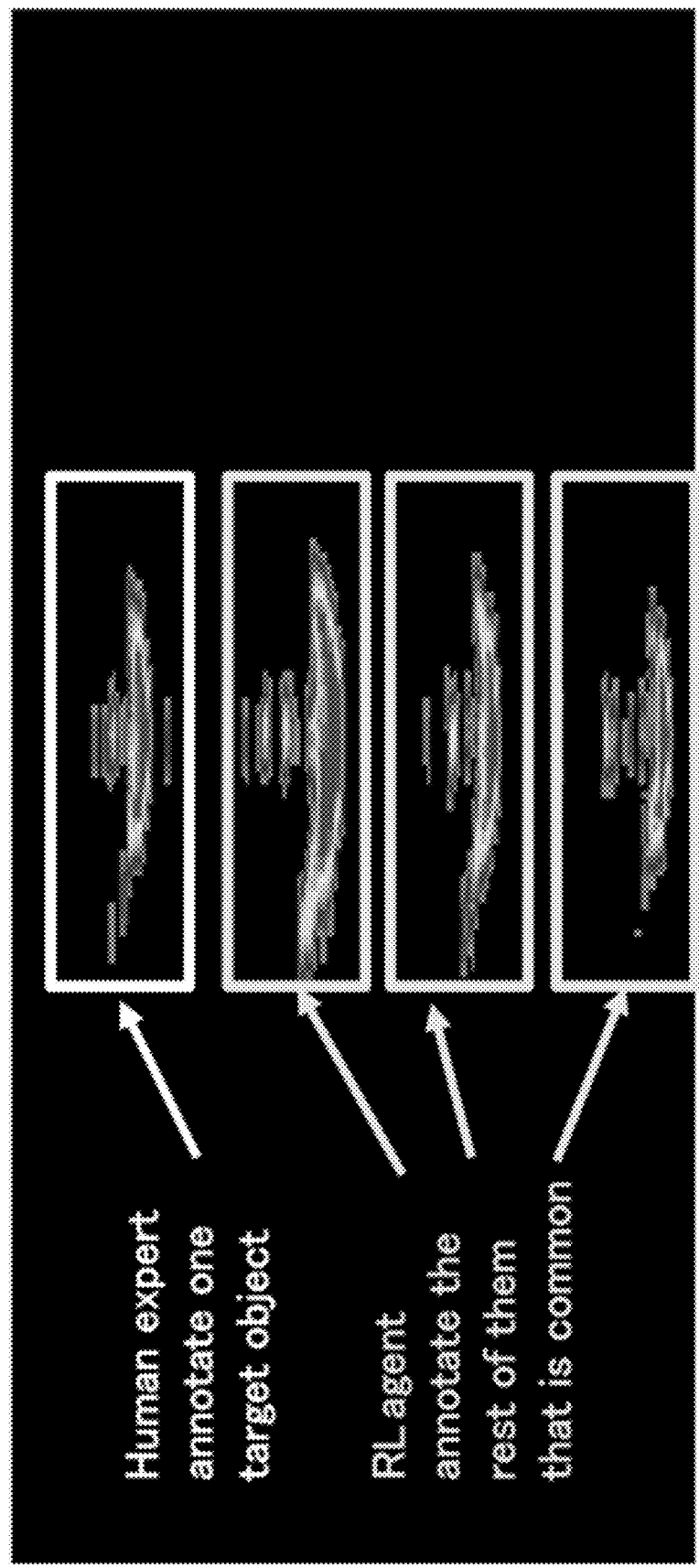
FIG. 3 is a schematic diagram illustrating application 1—human guided automatic annotation of fiber sensing dataset(s) wherein well-annotated data can benefit downstream training of an event classifier according to aspects of the present disclosure.

FIG. 3 is a schematic diagram illustrating application 1—human guided automatic annotation of fiber sensing dataset(s) wherein well-annotated data can benefit downstream training of an event classifier according to aspects of the present disclosure.

Figure 4:
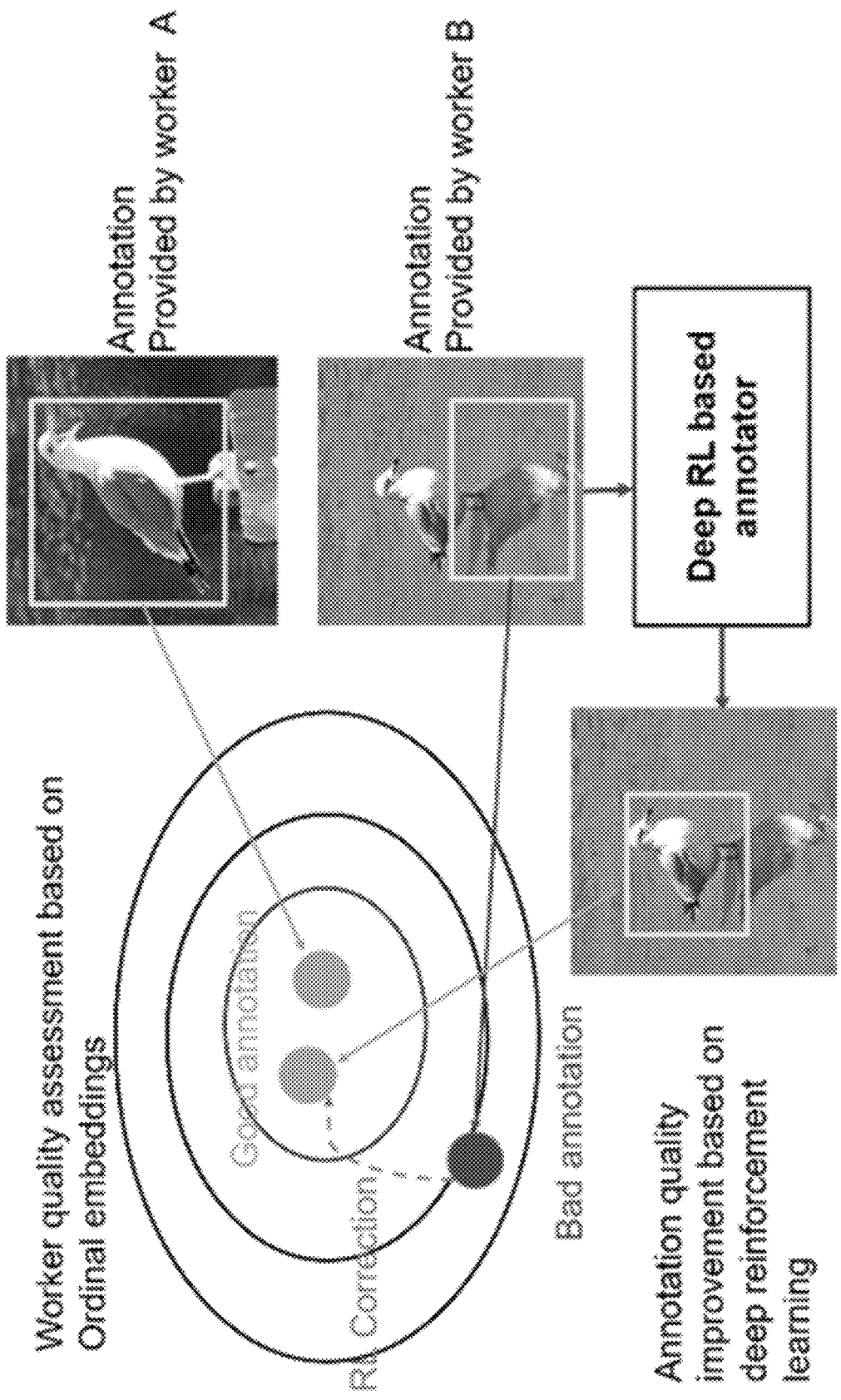
FIG. 4 is a schematic diagram illustrating application 2—worker quality assessment and improvement for crowdsourcing based images annotations platform wherein high quality annotation can be identified and low quality data can be corrected by the trained agent according to aspects of the present disclosure.

FIG. 4 is a schematic diagram illustrating application 2—worker quality assessment and improvement for crowdsourcing based images annotations platform wherein high quality annotation can be identified and low quality data can be corrected by the trained agent according to aspects of the present disclosure.

As we shall now describe, our inventive method/algorithm involves three steps in training.

Step 1: Identify a set of seed images. This can be acquired either from human experts, or a pre-selection heuristics, or a third-party dataset.

Figure 5:
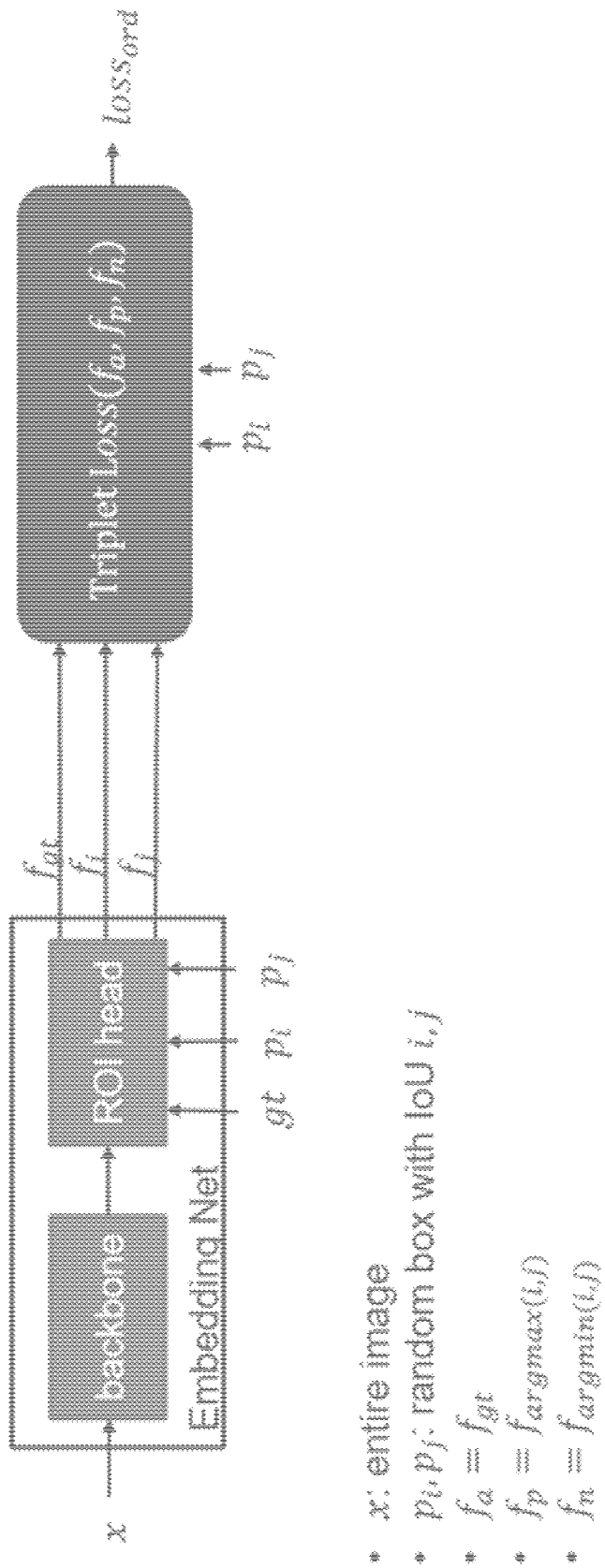
FIG. 5 is a schematic diagram illustrating ordinal representation learning of embedding net and triplet loss according to aspects of the present disclosure.
Figure 6:
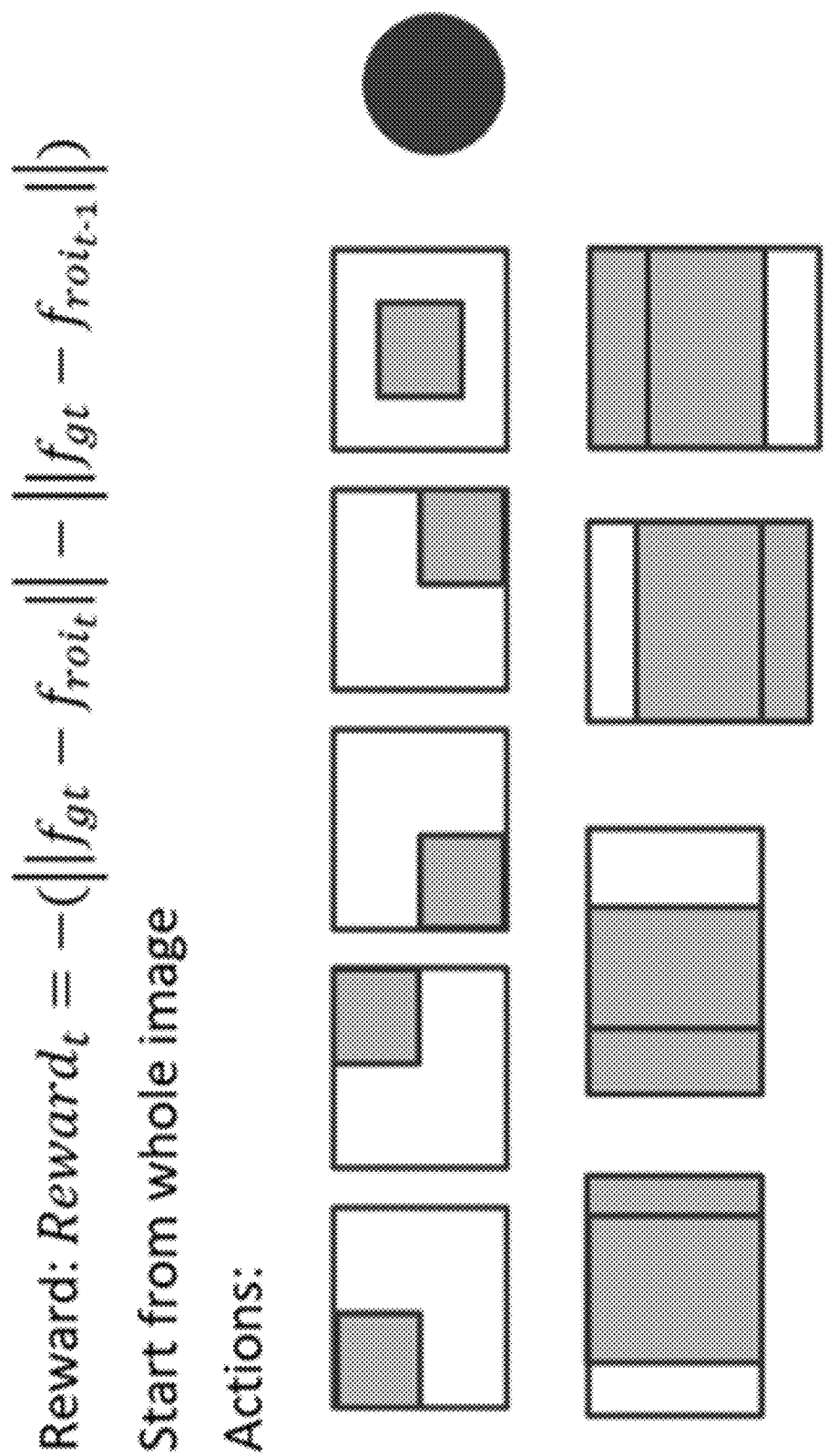
FIG. 6 is a schematic diagram illustrating ordinal embedding based reward and action space according to aspects of the present disclosure.
Figure 7:
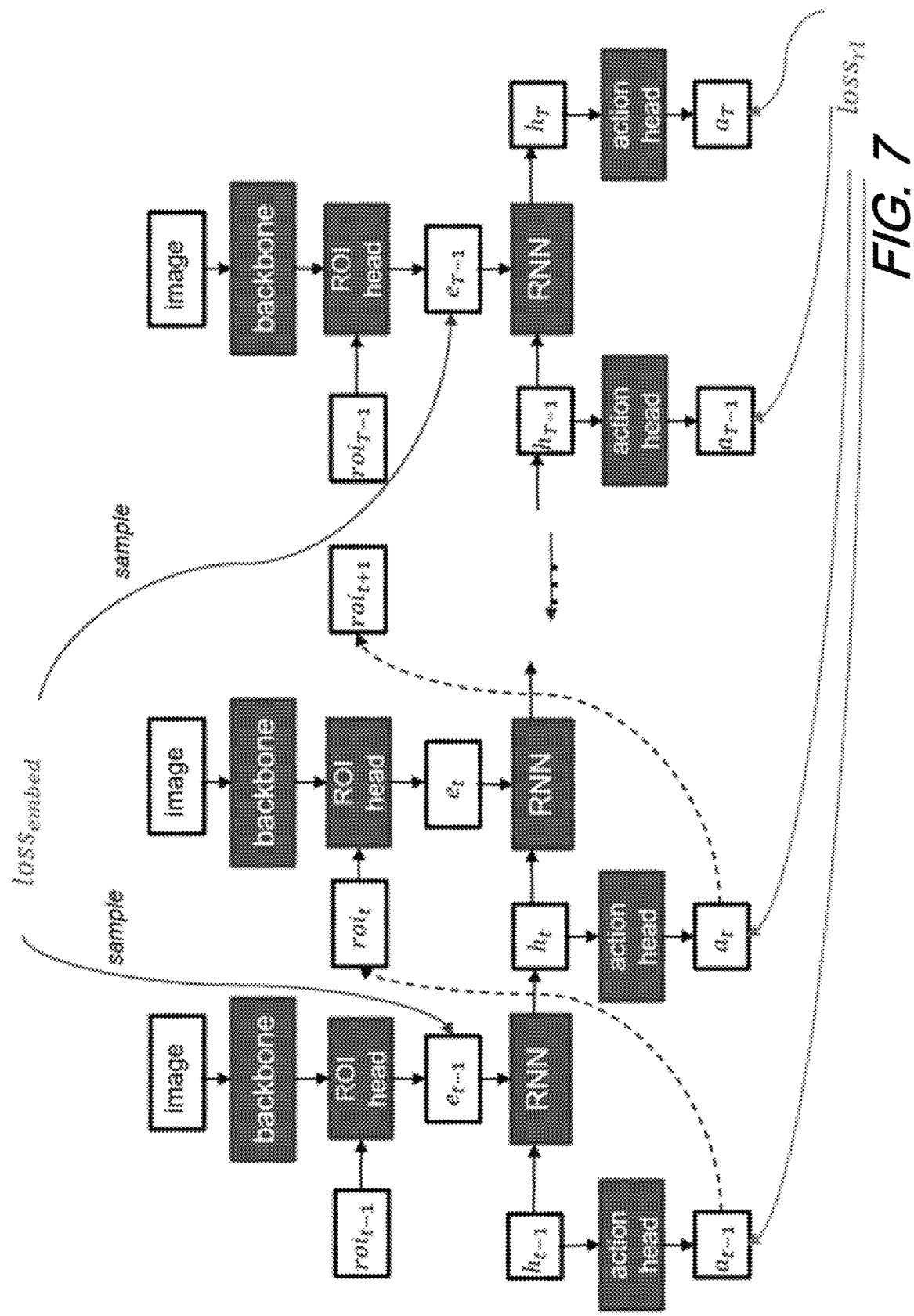
FIG. 7 is a schematic diagram illustrating a complete recurrent neural network (RNN) based architecture of RL agent and ordinal representation learning according to aspects of the present disclosure.

Step 2: Pretrain the ordinal embedding. Given a seed dataset, pretrain by randomly perturb the ground truth bounding box at different levels. The levels of perturbation are denoted by parameter p. The ordinal embedding needs to satisfy the ordinal constraint locally for each pair of perturbed data augmented from the same image. FIG. 5 is a schematic diagram illustrating ordinal representation learning of embedding net and triplet loss according to aspects of the present disclosure;

Step 3: Reinforcement Learning. Given an embedding function, the RL agents start from the whole image and recursively sample actions from a discrete action space. FIG. 6 is a schematic diagram illustrating ordinal embedding based reward and action space according to aspects of the present disclosure. The reward of actions are calculated from the embedding distances. The policy network (action head) is jointly updated with the embedding network. The neural network architecture is detailed in FIG. 7 which is a schematic diagram illustrating a complete recurrent neural network (RNN) based architecture of RL agent and ordinal representation learning according to aspects of the present disclosure.

Figure 8A:
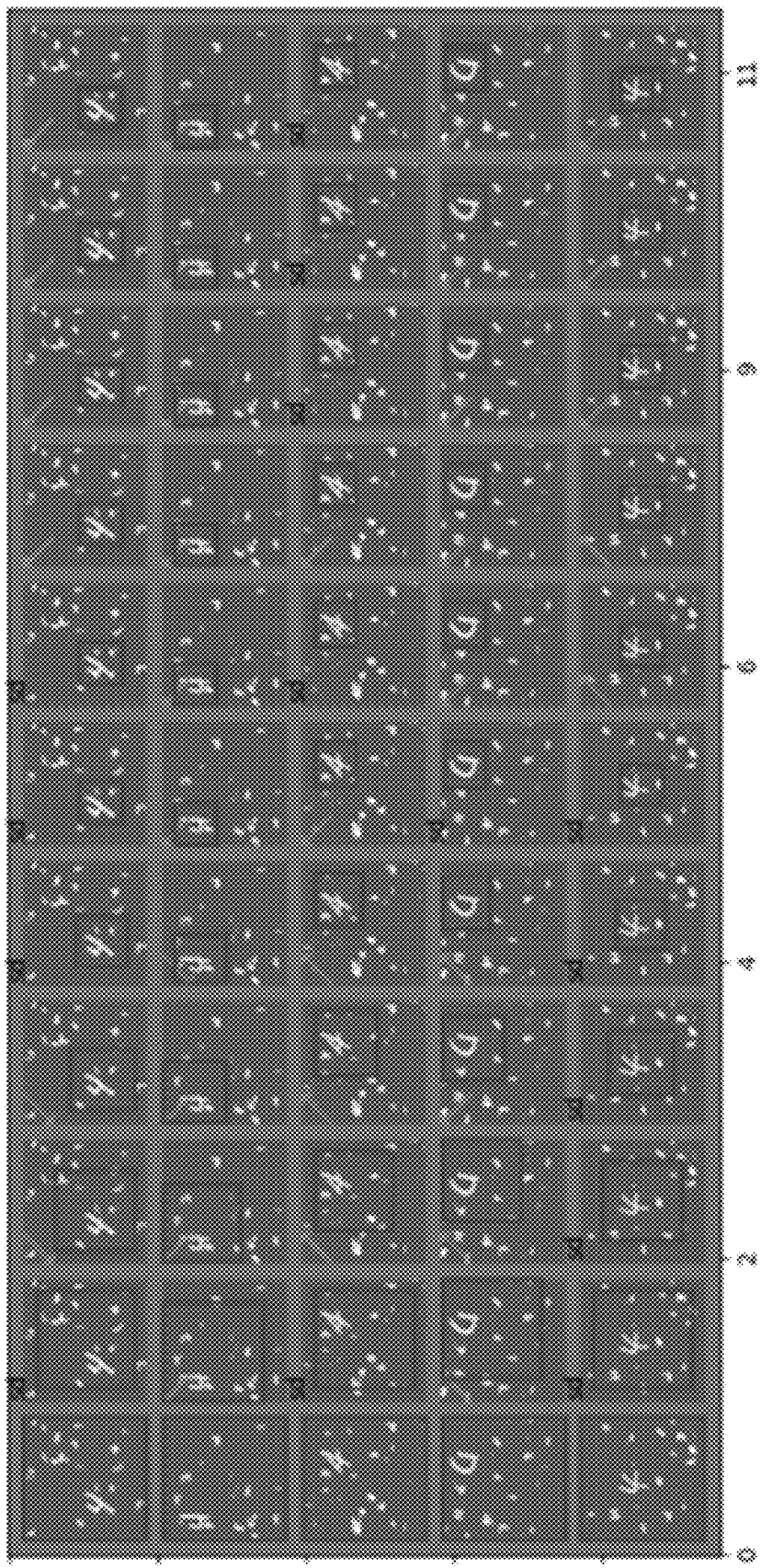
FIG. 8(A), FIG. 8(B), and FIG. 8(C) illustrate action sequence of RL agent and convergence of learning and plots of co-localization of digits 4 from cluttered background and the convergence of embedding distance to ground truth according to aspects of the present disclosure.
Figure 8B:
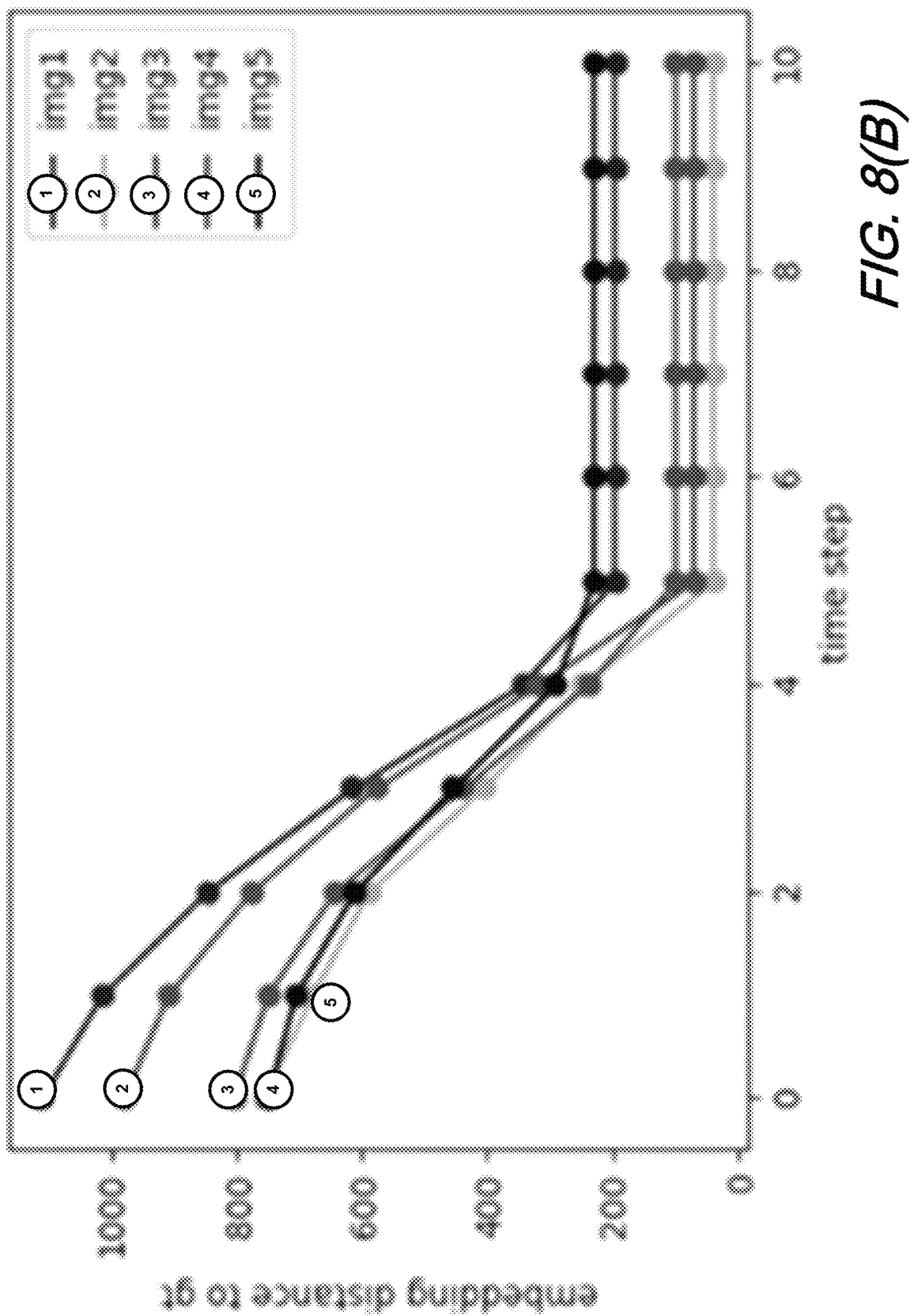
Figure 8C:
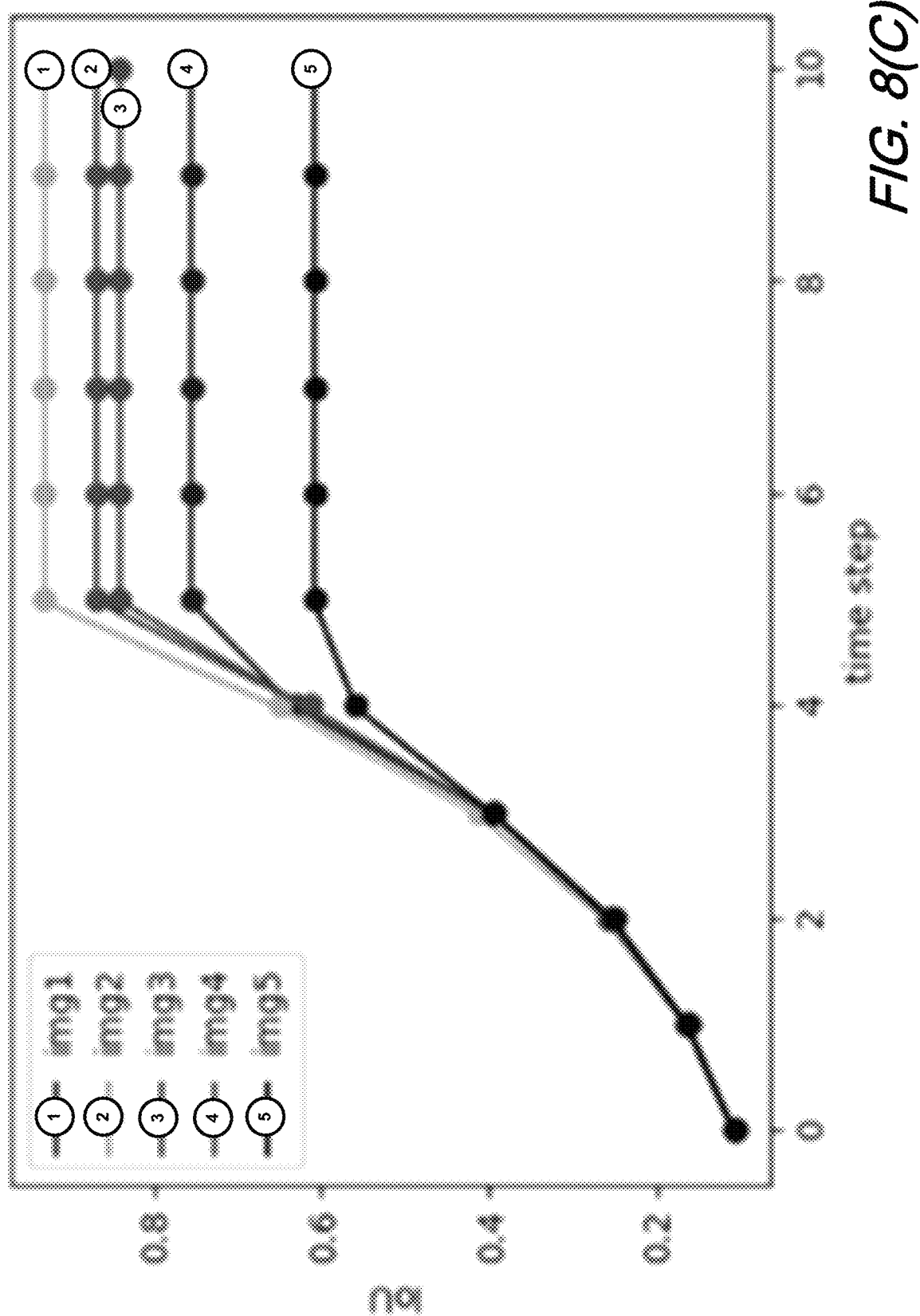

The effectiveness of the proposed approach is evaluated at Clutter MNIST benchmark dataset. FIG. 8(A), FIG. 8(B), and FIG. 8(C) illustrate action sequence of RL agent and convergence of learning and plots of co-localization of digits 4 from cluttered background and the convergence of embedding distance to ground truth according to aspects of the present disclosure. The figure demonstrates advantages of joint training in terms of final localization performance and shows that the agent trained on a co-localization task one digits to adapt to find new classes of common objects (0~3, 5~9), that is unseen in the training phase.

Our inventive system and method jointly conduct ordinal representation learning and deep reinforcement learning, to overcome the shortage of high-quality annotated data. Our system and method can be applied broadly to fully supervised, weakly-supervised, and co-localization tasks.

Our system and method employ the human-in-the-loop paradigm, which effectively utilizes a limited amount of high-quality, high confidence human annotated data, to identify and improve the quality of low-quality annotated data.

As those skilled in the art will readily understand and appreciate, our inventive system and method may benefit a number of applications namely, 1) as a tool to automatically annotate unlabeled dataset, in cost sensitive applications include but not limited to fiber sensing; 2) as a tool to enhance the interpretability of deep neural networks such as the class activation map (CAM) methods; 3) as a tool to assess the quality of annotation, and improve low-quality annotations on crowdsourcing platform; and 4) as a tool to localize multiple common target objects within the same image such as crops from satellite image in intelligent agriculture or cells from whole-slide image in digital pathology.

The illustrative embodiments are described more fully by the Figures and detailed description. Embodiments according to this disclosure may, however, be embodied in various forms and are not limited to specific or illustrative embodiments described in the drawing and detailed description.

FIG. 9 is a dataset comparing fixed embedding vs training embedding during RL updates according to aspects of the present disclosure; and FIG. 10 is a dataset showing agent trained and tested on digits 4, as well as other new digits 0-9 according to aspects of the present disclosure.

At this point we describe a reinforcement learning based approach to the problem of query object localization, where an agent is trained to localize objects of interest specified by a small exemplary set. We learn a transferable reward signal formulated using the exemplary set by ordinal metric learning. It enables test-time policy adaptation to new environments where the reward signals are not readily available, and thus outperforms fine-tuning approaches that are limited to annotated images. In addition, the transferable reward allows repurposing of the trained agent for new tasks, such as annotation refinement, or selective localization from multiple common objects across a set of images. Experiments on corrupted MNIST dataset and CU-Birds dataset demonstrate the effectiveness of our approach.

In this disclosure, we focus on the reinforcement learning (RL) formulation to the problem of query object localization, where an agent is trained to localize the target object specified by a small set of exemplary images. The vision-based agent can be viewed as a proactive information gatherer that actively interacts with the image environment, following a class-specific localization policy, thus will be more suitable for robotic manipulation or embodied AI tasks.

During test-time, the queried object to localize may be novel, or the background environment may undergo substantial change, hindering the applicability of class-agnostic agents with fixed policy. When reward signal is available, fine-tuning methods can effectively adapt agents to the new environment and yield improved performance. Different from standard RL settings, the reward signal is not available in our application during test-time, as the bounding box annotations are to be found by the localization agent on test images.

To address this problem, we describe an ordinal metric learning based framework for learning an implicitly transferable reward signal defined with a small exemplary set. An ordinal embedding network is pre-trained with data augmentation under a loss function designed to be relevant to the RL task. The reward signal allows explicit updates of the controller in the policy network with continual training during test-time. Compared to fine-tuning approaches, the agents can get exposed to the new environment more extensively with unlimited usage of test images. Informed by the exemplary set precisely, the agent is versatile to the change of localization target.

Figure 11:
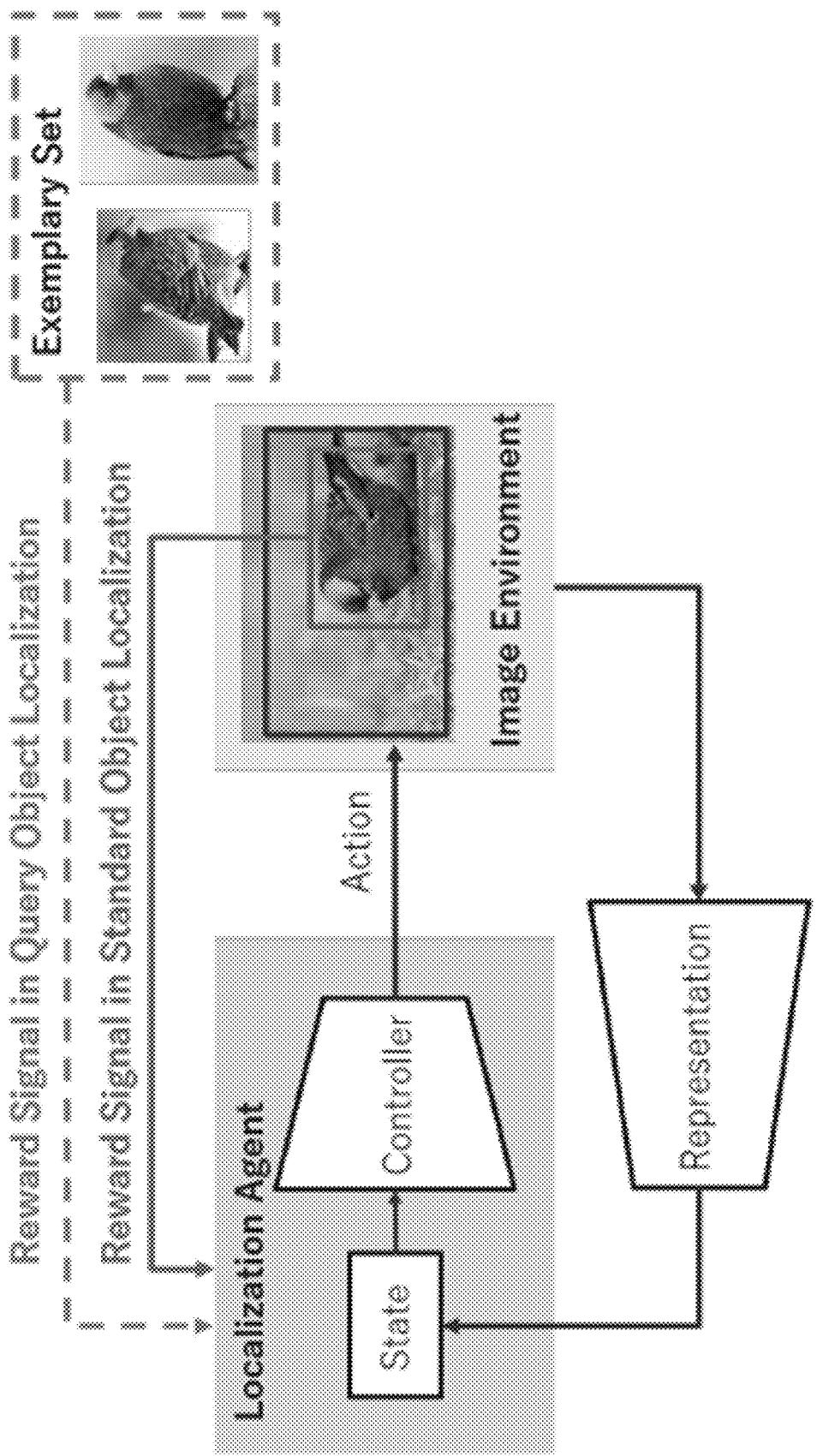
FIG. 11 is a schematic diagram showing RL-based query object localization having reward signal defined on an exemplary set rather than bounding boxes according to aspects of the present disclosure.

FIG. 11 is a schematic diagram showing RL-based query object localization having reward signal defined on an exemplary set rather than bounding boxes according to aspects of the present disclosure.

As compared to bounding-box regression approaches, off-policy RL based object localization approaches have the advantage of being region-proposal free, with customized search paths to each image environment. The specificity of agent purely depends on the classes of bounding-boxes used in the reward. They can be made class-specific, but agent for each class would need to be trained separately.

Despite the rise of crowdsourcing platforms, obtaining an ample amount of bounding-box annotations remains costly and error-prone. Furthermore, the quality of annotation often varies, and precise annotations for certain object class may require special expertise from annotators. The emergence of weakly supervised object localization (WSOL) methods alleviates the situation, which utilize image class labels in deriving bounding box annotations. It is known that WSOL methods have drawbacks of overly relying on the inter-class discriminative features and not being able to generalize to classes unseen during the training phase.

We note that intra-class similarity is a more natural objective for the problem of localizing objects belonging to the target class. A similar problem is image co-localization, where the task is to identify the common objects within a set of images. Co-localization approaches exploit the common characteristics across images to localize objects. Being unsupervised, co-localization approaches could suffer from ambiguity if there exist multiple common objects or parts, e.g., bird head and body, which may provide the unwanted common objects as output.

There exists an apparent contradiction between the goals of training an agent with high task-specificity and better generalization performance to new situations at the same time. The key to reconcile these two goals lies in the usage of a small set of examples. There has been a paradigm shift from training static models defined with parameters to ones defined together with a support set, which have proven to be very effective in the few-shot training.

Besides the effort of meta learning implicitly adjustable models, fine-tuning on a pretrained model has also been used in transferring knowledge from data-abundant to data-scarce tasks. When reward signal is not available, a policy adaptation approach may be employed in which the intermediate representation is fine-tuned via optimizing a self-supervised auxiliary loss while the controller is kept fixed. Our disclosure shares the same motivation of test-time training, but we focus instead on the settings where the controller needs to be adapted or even repurposed for new tasks.

In query object localization, we are given a set of images I, and a small set of exemplary images E. The image annotation is available in the form of a bounding box g. Our goal is to find the location of the bounding box containing the queried object in each image without candidate boxes.

Considering each image $I_i$ as an environment, existing RL approaches for object localization use its ground-truth object bounding box $g_i$ as the reward signal, $$R=\text{sign}(\text{IoU}(b_t,g_i)-\text{IoU}(b_{t-1},g_i)), \quad (1)$$

where $\text{IoU}(b_t,g_i)$ denotes the Intersection-over-Union (IoU) between the current window $b_t$ and the corresponding ground-truth box $g_i$, and $\text{IoU}(b,g)=\text{area}(b\cap g)/\text{area}(b\cup g)$. Similar to the bounding box regression approaches which learns a mapping $f: 17 \to g$, the image and box must be paired. However, annotated image-box pairs (I,g) may be scarce in both the training and testing phases. The reward signal in (??) is not transferable across training images, not to mention test image with potential domain shifts.

To address this problem, a natural idea is to define the reward signal based on the distance between the cropped images by current window $b_t$ and the ground-truth window g. Given their M-dimensional representations $b_t$ and g produced by an embedding function $f:R^D7 \to R^M$ from D-dimensional image feature vectors, a distance function $d:R^M \times R^M7 \to 8\ 0, +\infty)$ return the embedding distance $d(b_t,g)$. However, it may not decrease monotonically as the agent approaches to the ground-truth box g. As a result, the embedding distance based reward signal may be less effective than (??).

Furthermore, we propose to use an ordinal embedding based reward signal. For any two perturbed boxes $b_j,b_k$ from g in a constraint set C, embeddings $b_i,b_k,g$ are learned, such that the relative preference between any pair of boxes are preserved in the Euclidean space, $$p_j > p_k \Leftrightarrow \|b_j-g\| < \|b_k-g\|, \forall j,k \in C, \quad (2)$$

where $p_j$ and $p_k$ denote the preference (derived from IoU to ground-truth box or ordinal feedbacks from user). This problem is originally posed as non-metric multidimensional scaling. Although we apply a very simple pairwise-based approach, there exist other extensions such as the listwise-based, quadruplet-based and landmark-based.

The anchor g in (2) is not restrictive to the embedding coming from the same image. For example, it could be replaced by the prototype embedding of the exemplary set E, $c=1/|E|^P_{i \in E}b_i$, where $b_i$ is the embedding of the cropped image $I_i$ by ground-truth box $g_i$. If images from multiple classes are available, the prototype can be further made to be class-dependent, or clustering-based. We find that prototype-based embedding as the anchor may have better generalization performance than g in some experiments. This choice also makes our approach amenable to few-shot training, when only a small subset of training images per class are annotated. The ordinal reward can be viewed as meta information. Moreover, even if the exemplary set during the test time only contains the cropped object, test-time policy adaptation is still feasible without image-box pairs.

We assume that during the training time, the exemplary set E contains both image I and box g. We adopt a tailored data augmentation scheme—box perturbation, in which C is constructed by sampling box pairs around g. We have found that using IoU-based partition scheme is more effective than random sampling. This can be viewed as a procedure to enhance the robustness of neural network against box perturbations and protect the special purpose of its usage on distinguishing reward increases or decreases. Pre-training with data augmentation can also make the downstream task of policy network training more efficient.

In this disclosure, we define p as the IoU of box b to the ground-truth box g, i.e., $p=\text{IoU}(b,g)$. We learn an embedding space consistent to the local ordinal constraints specified on the image pairs obtained via data augmentation.

We choose to optimize the triplet loss for learning the desired embedding, $$\mathcal{L}_{trip} = \Sigma \max(m+d(f_a,f_p)-d(f_a,f_n),0), \quad (3)$$

where $f_a$ is the "anchor" embedding. $f_p, f_n$ are the "positive" and "negative" embeddings with larger and smaller IoUs with ground truth box g, respectively. Note that a good representation for defining reward may not necessarily be a good state representation at the same time—it may not contain enough information guiding the agent taking the right actions. suggests that adding a projection head between the representation and the contrastive loss substantially improves the quality of the learned representation.

Figure 12:
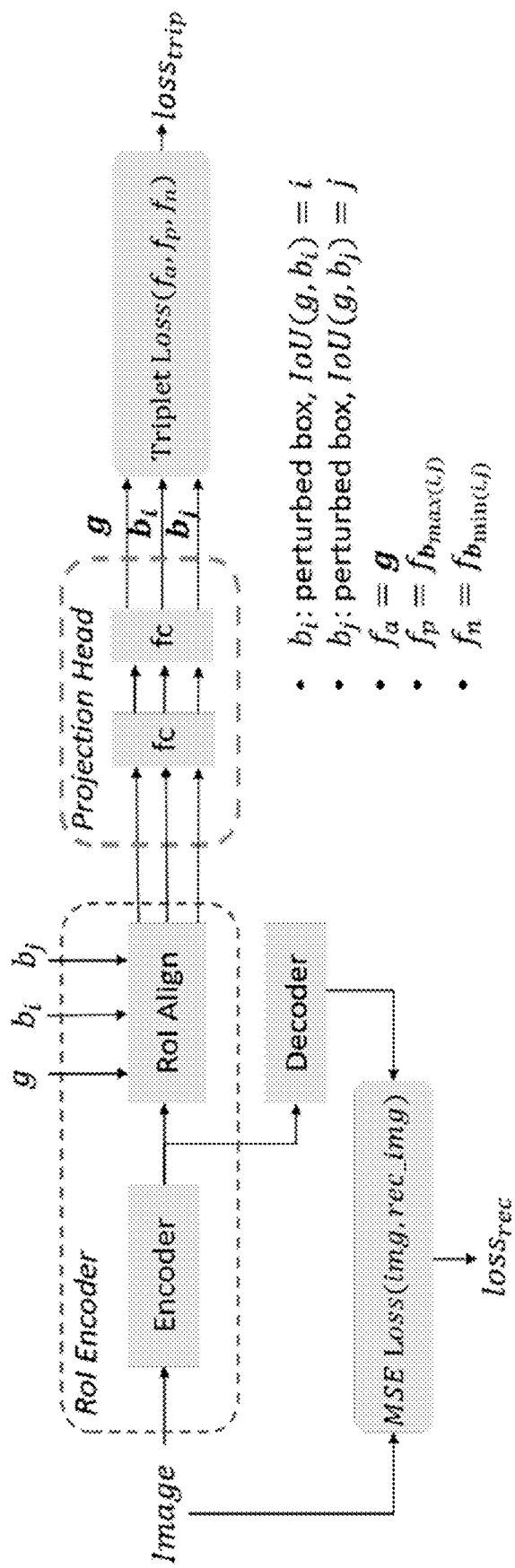
FIG. 12 is a schematic diagram showing an illustrative RoI encoder and projection head according to aspects of the present disclosure.

We find the use of projection head is crucial in balancing the two objectives in our task. The network architecture is shown in FIG. 12, in which an MLP projection head is attached after an (Region of Interest) RoI encoder. According to the given image and RoI, the RoI encoder extracts RoI feature s that will be used the state representation for localization. The projection head learns ordinal embedding b for computing reward. The RoI alignment module handles boxes of different size. Under a joint loss function $\text{loss}_{embed}=\text{loss}_{rec}+\lambda \cdot \text{loss}_{trip}$, the state representation s can indirectly benefit from the ordinal supervision on b, while it still must render satisfactory image reconstruction results. Beside the autoencoder scheme, the RoI encoder can use pre-trained network as well.

The localization is formulated as a Markov Decision Process (MDP) with raw pixels in each image as the Environment. As discussed herein, we use the ordinal embedding rather than the bounding box coordinates to compute the improvement that agent makes, and the Reward for an agent moving from state $s^o$ to s takes the following form, $$R(s,s^o)=\|b_t-a\|-\|b_{t-1}-a\|, \quad (4)$$

where a is the prototype embedding. Ordinal embeddings are extracted from the image regions surrounded by the ground-truth boxes in E, by the pre-trained RoI encoder and projection head, and the prototype is computed as the mean vector. Furthermore, we use policy gradient with recurrent neural network (RNN) (Mnih et al., 2014) rather than DeepQNetwork with a vector of history actions and states. Starting from the whole image pixels as input, the agent is trained to select the actions to transform current bounding box at each step, by maximizing the total discounted reward. The agent takes pooled feature from the current box as State, while it also maintains an internal state within RNN, which encodes information from history observations. The Action set is defined with discrete actions facilitating a top-down search, including five scaling, eight translation transformations as in, plus one stay action.

Test-time Adaptation During test-time, the agent has the option of further updating the policy network using the received reward from (4) with a as the prototype of the test exemplary set $E_{test}$. To match test conditions, the training batch is split into two group and a is computed on a small subset that does not overlap with the training images to localize, while during test adaptation, a becomes the prototype of the exemplary set. The full algorithm is outlined in Algorithm 1 which is illustratively shown in FIG. 19.

The transferability of our reward signal from training to testing crucially relies on the generalization ability of the learned ordinal representation. If the ordinal preference does not hold in the test domain, the proposed test-time policy adaptation scheme will not work. By adapting the representation with self-supervised objectives, this issue might be remedied. Although our approach does not directly handle the special cases of multiple queried objects or no queried object within the image environment, it can be easily modified to accomplish these tasks.

We evaluate our approach with several tasks on MNIST and CUB birds dataset. For MNIST, we use three convolutional layers with ReLU activation after each layer as image encoder, while the same but mirrored structure as decoder to learn an autoencoder. Then attach RoI align layer following two fully connected layers as projection head for ordinal reward learning. For CUB dataset, we adopt layers before conv5_3 of VGG16 pretrained on ImageNet encoder. The projection head is the same structure as before but with more units for each fully connected layer. To evaluate learned ordinal structure, we use OrdAcc defined as the percentage of images where the order of a pair of perturbed boxes is correctly predicted. We use the Correct Localization (CorLoc)) metric, which is defined as the percentage of images correctly localized according to the criterion area($b_p \cap g$)/area($b_p \cup g$)≥0.5, where $b_p$ is the predicted box and g is the ground-truth box.

We analyze the effectiveness of using ordinal embedding in terms of representation and reward on Cluttered MNIST. Each 28×28 digit is randomly put on an 84×84 cluttered background. We compare embeddings trained with only autoencoder and jointly trained with ordinal projection head. Besides, we also compare the IoU based reward used with our embedding based reward. The agent is trained on specific number of digit 4 images. And tested on all images in the test set. The results under different train set size(s) are shown in FIG. 13(A), and FIG. 13(B) which are datasets that illustrate: FIG. 13(A) random sampling and anchor sampling on OrdAcc (%); and FIG. 13(B) a comparison with and without sign for IoU reward on CorLoc (%) according to aspects of the present disclosure. With ordinal embedding presents in both representation and reward ("AE+Ord+Embed"), the model performance is consistently better than other settings, especially when train set size is small.

Figure 14A:
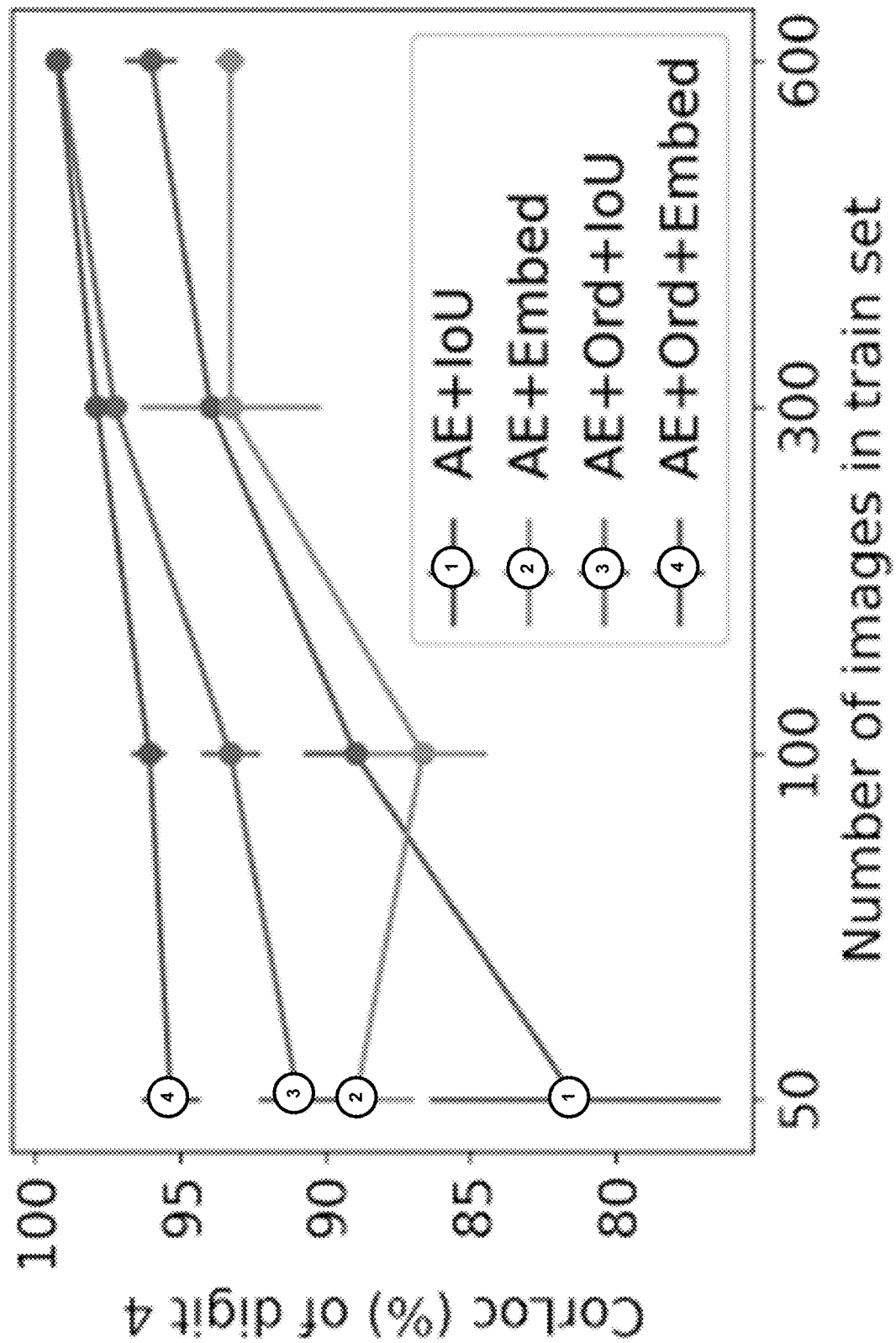
FIG. 14(A), and FIG. 14(B) are plots that illustrate comparison under different train set sizes according to aspects of the present disclosure.
Figure 14B:
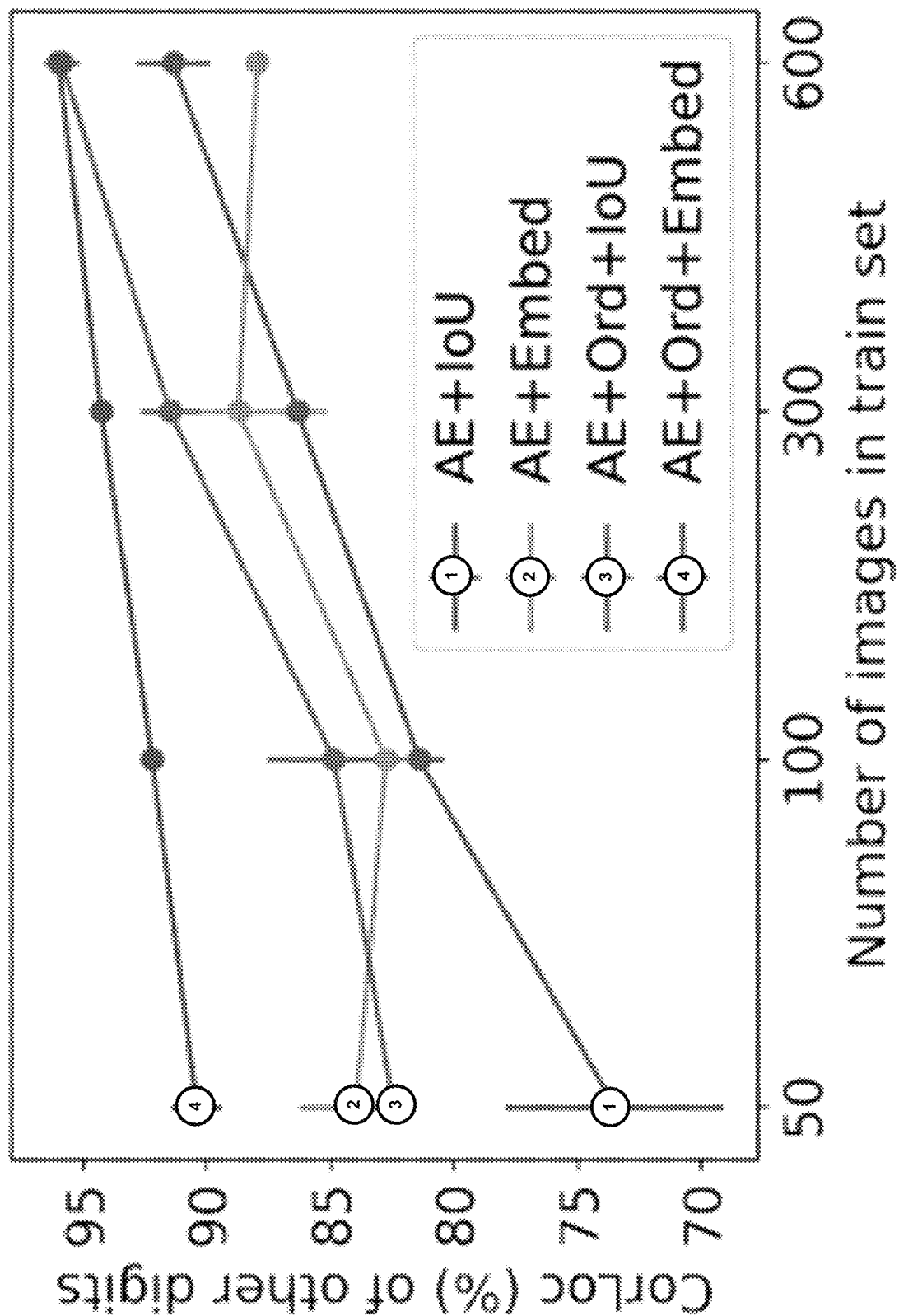

FIG. 14(A), and FIG. 14(B) are plots that illustrate comparison under different train set sizes according to aspects of the present disclosure.

To learn ordinal reward efficiently, we conduct experiments to compare the sampling strategy of generating augmented bounding box pair. The first strategy is random sampling, where the pair of boxes are generated completely randomly. The other one is sampling by anchor, where we first generate dense anchors with variant scales, then divide them into 10 groups according to the IoU with ground-truth box. Each group has an interval of 0.1. The sampling is first on group level, i.e., sampling two groups. Then sample two boxes corresponding to each group. Thus, the sampled boxes can cover more cases compared to random sampling. The resulting OrdAcc of the two strategies is shown in FIG. 13(A). With anchor sampling, we can learn better ordinal embedding.

Reward $\{+1,-1\}$, sign or not sign use Eq. 1 as reward to train the agent. However, from FIG. 14(A) and FIG. 14(B), it can be seen that there is a large gap between this IoU reward and our Embed reward, especially when train set size is small. This is somewhat counter-intuitive as the ordinal reward is to approximate the property of IoU in embedding space, thus it should be less accurate than IoU as a reward. To analyze this problem, we take the sign operation off in Eq. 1 to train the models on digit 4 images. As shown in FIG. 13(B), with sign operation, the localization accuracies increase 3.4% on digit 4 and 6.2% on other digits test set.

FIG. 15(A), and FIG. 15(B) are datasets that illustrate: FIG. 15(A) CorLoc (%); and FIG. 15(B) a comparison of four training strategies according to the anchor used according to aspects of the present disclosure.

As opposed to using a Deep Q-Network to train the agent, we apply policy gradient to optimize it. Besides, we adopt top-down search strategy through RNN, while they used a vector of history actions to encode memory in these works. We evaluate the design choices with models trained and tested on digit 4 or tested on other digits, as FIG. 15(A) shows. As we can see, the agent achieves best performance with "PG+RNN". While with history action vectors, the accuracy decreases when the agent is trained by DQN.

We conducted experiments to evaluate the effects on ordinal reward learning and localization of different training strategy on a subset of CUB dataset, where the train and test set contains 15 and 5 different fine-grained classes respectively, resulting 896 images for training and 294 for testing. FIG. 15(B) shows the OrdAcc and CorLoc of four settings: "Self", both embedding pretraining and agent training is using the ground-truth from this instance as anchor; "Proto", both use the prototype of a subgroup containing this instance within a batch; "Shuffle self", both use the ground-truth from another instance; "Shuffle proto", both use the prototype of a subgroup without this instance within a batch. The RoI Encoder is trained with only $loss_{trip}$. Thus, the whole train set can be seen as a single class. From the results, while the OrdAcc is lower than others for "Shuffle proto", the CorLoc is the best with large margin. This phenomena suggests that this training strategy brings compactness to the train set, constructing an ordinal structure around the cluster. Note that the OrdAcc is computed using instance as anchor.

As will now be appreciated by those skilled in the art, we disclose an ordinal representation learning based reward, for training a localization agent to search queried object of interest in potentially new environments. In particular, we use a small exemplary set as a guidance signal for delivering learning objectives, which can avoid learning ambiguity. Meanwhile, we use test images environment to inform the agent about the domain shifts without requiring image-box pairs during the test-time. Our algorithm takes raw image pixels as input with no need of proposing candidate boxes.

Our approach is based on the feature similarity with the exemplary set, which is fundamentally different with bounding-box regression and bounding-box RL approaches. In order to generalize to various object classes and background scenario, previous approaches have to be trained as class agnostic on large datasets covering foreground and background variations. In contrast, we allow specialized agents to be trained, with policy adaptation ability during the test-time.

Instead of jointly training the localization model with the classification model, we explore learning box annotations from image class labels, in a similar spirit with weakly-supervised learning. Given an image label from a classification model, our localization model can identify the box region with enhanced interpretability. Empirically, we show that our approach works on the transfer learning setting from one single data abundant source task to data-scarce test tasks. In addition, our approach also applies to the few-shot learning setting where limited annotations across a number of tasks are available during training. Future work includes cross-modality query or zero-shot query based on attributes, and curriculum learning with a designed sequence of targets in the exemplary set.

Annotation collection plays an important role in building machine learning systems. It is one task that could benefit greatly from automation, especially in cost-sensitive applications. We aim to reduce the human labeling efforts, in terms of the number of annotate samples per class, number of annotate classes, and the level of accuracy required. Our approach enables objective evaluation and iterative refinement of data quality.

Figure 17:
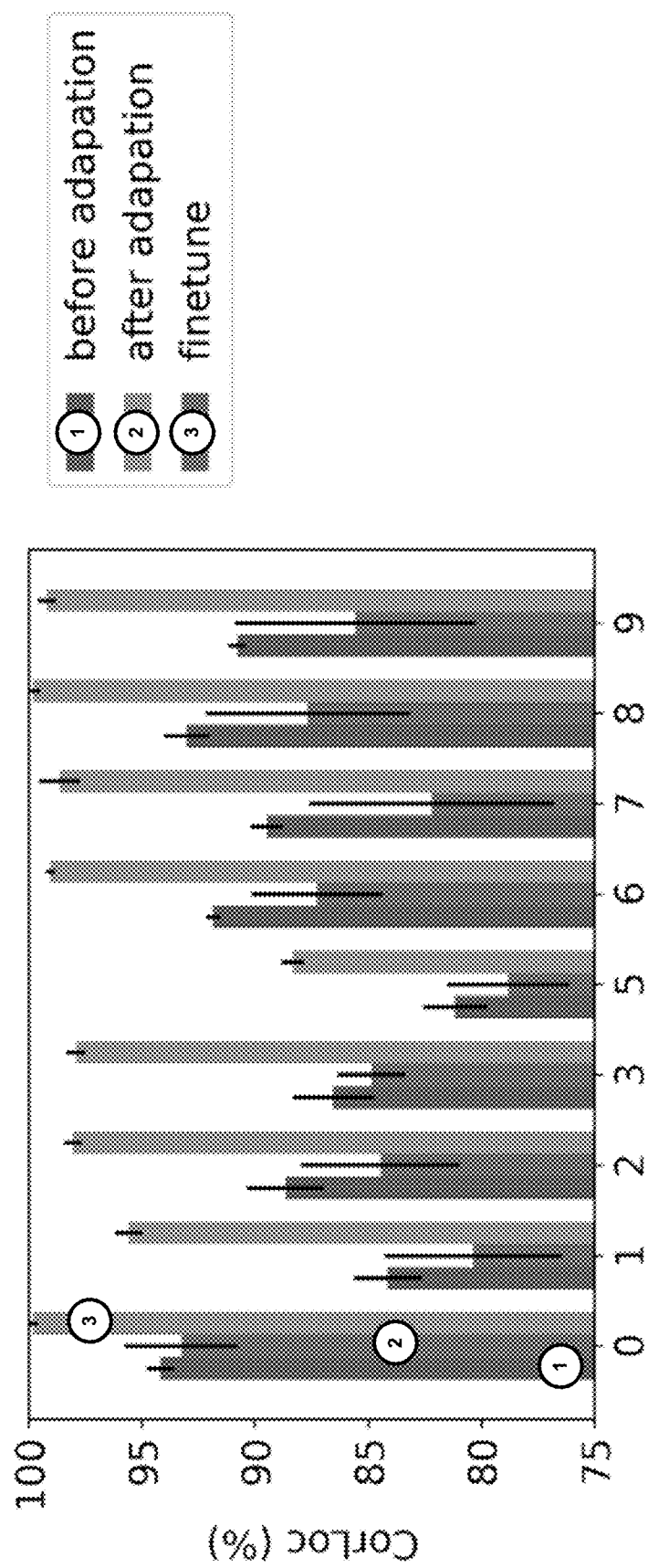
FIG. 17 is a plot showing before, after, and finetuning of adaption according to the anchor used according to aspects of the present disclosure.

FIG. 16 is a dataset that illustrates performance on different digits according to the anchor used according to aspects of the present disclosure;

FIG. 17 is a plot showing before, after, and finetuning of adaption according to the anchor used according to aspects of the present disclosure;

FIG. 18(A), and FIG. 18(B) are datasets that illustrate: FIG. 18(A) performance of loose to tight annotated bounding box; and FIG. 18(B) performance when transferring to other background according to aspects of the present disclosure;

FIG. 19 is a listing of an Algorithm I for training and reward localization agent according to the anchor used according to aspects of the present disclosure.

At this point, while we have presented this disclosure using some specific examples, those skilled in the art will recognize that our teachings are not so limited. Accordingly, this disclosure should be only limited by the scope of the claims attached hereto.

The invention claimed is:

1. A deep reinforcement learning (RL) method for object localization comprising:
   acquiring a seed dataset including a set of seed images each with ground truth bounding box annotation;
   pretrain ordinal embedding by randomly perturbing the ground truth bounding box at different levels denoted by parameter p, said ordinal embedding satisfying an ordinal constraint locally for each pair of perturbed data augmented from the same image, wherein the pretraining is performed through the effect of a backbone network, a region of interest (RoI) head, and a triplet loss; and
   using an embedding function, configuring RL agents to start from a whole image and recursively sample actions from a discrete action space such that rewards are produced, the rewards of a sample action determined from embedding distances and updating a policy network based on the rewards so determined; and
   outputting an annotation policy and embedding function.

2. The method of claim 1 wherein the seed image bounding box annotation is initially provided by a human action.

* * * * *